L. PONDELICK.
RETAINER FOR BALL BEARINGS.
APPLICATION FILED FEB. 10, 1912.
1,051,911.
Patented Feb. 4, 1913.
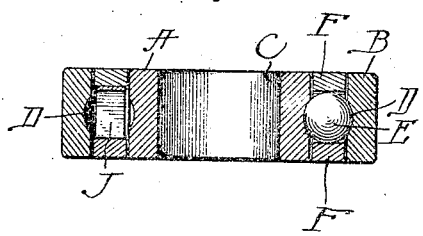
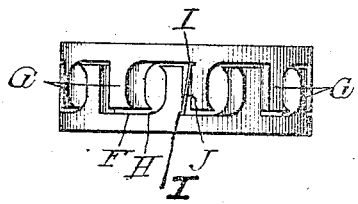
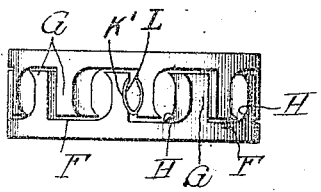
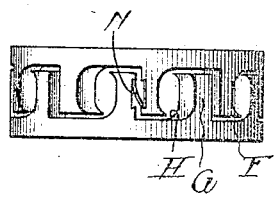
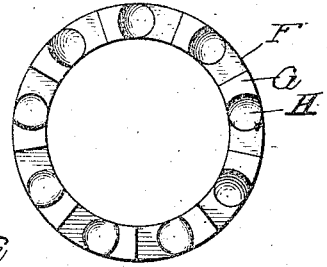
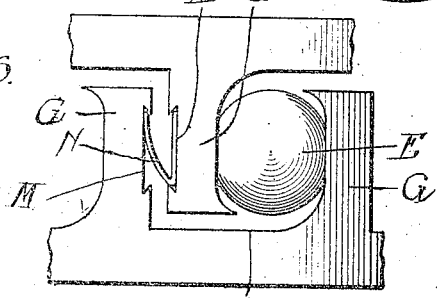
Witnesses:
Robert H. Weir
Leo C. DuMais
Inventor:
Leo Pondelick
By Rudolph ... Atty.

UNITED STATES PATENT OFFICE.

LEO PONDELICK, OF CHICAGO, ILLINOIS.

RETAINER FOR BALL-BEARINGS.

1,051,911.  Specification of Letters Patent.  Patented Feb. 4, 1913.

Application filed February 10, 1912. Serial No. 676,824.

*To all whom it may concern:*

Be it known that I, LEO PONDELICK, subject of the Emperor of Austria-Hungary, residing at Chicago, in the county of Cook and State of Illinois, have invented certain new and useful Improvements in Retainers for Ball-Bearings; and I do hereby declare the following to be a full, clear, and exact description of the invention, such as will enable others skilled in the art to which it appertains to make and use the same.

This invention has for its object to provide an improved retaining device for ball bearings, and consists in the features of construction and combinations of parts hereinafter fully described and claimed.

In the accompanying drawings illustrating the invention: Figure —1— is a central longitudinal section through a ball bearing equipped with a retaining device constructed in accordance with my invention. Fig. —2— is a side elevation of the retainer removed from the bearing. Fig. —3— is a view similar to Fig. —2— showing a slightly modified form of construction. Fig. —4— is a view similar to Fig. —2— showing a further modification in construction. Fig. —5— is a view in end elevation of one member of the retaining device. Fig. —6— is a fragmentary enlarged detail side elevation of the form of construction shown in Fig. —4— showing more particularly the manner of mounting a spring between the two members of the retainer.

Ball bearings of the type shown in Fig. —1—, in which the balls are sprung into and out of place between two concentric relatively rotatable members and which are equipped with less than the number of balls required to completely fill the annular space between said members, are equipped with what are known as retainers for keeping the balls the requisite distance apart at all times during relative rotation of the members between which they are interposed. A large number of said retaining devices of different constructions have been produced and are found on the market.

My device, shown in the accompanying drawings, has for its particular object to provide two separable members entering a runway for the balls from opposite sides and engaging said balls therebetween and between projections on said respective members, and in which the members are held against separation in a direction to withdraw said projections from the runways for the balls by engagement with the balls themselves and by engagement with springs interposed between contiguous projections of the respective members for normally maintaining said respective members in given relative normal position rotatably relatively to each other, and which said members may, when desired, be separated and removed for the purpose of removing and inserting balls in the runways of the bearing.

The bearing to which my said device is adapted to be applied consists of two rings A and B disposed concentric with each other and provided in their opposing circumferential faces with grooves or runways C and D for the balls E. The number and size of the latter interposed between said members A and B is dependent upon the relative diameters of the said members, the total number of balls employed being adapted when disposed in contact with each other, to extend through an arc slightly greater than one hundred and eighty (180) degrees, thus permitting said members to be sprung out of relative concentric positions for the purpose of increasing the width of space between the same at one point for the purpose of permitting balls to be removed and replaced. In the instance illustrated there are nine (9) balls E interposed between the members E and B, said balls when placed in contact with each other extending through an arc a little greater than one hundred eighty (180) degrees. It is necessary that said balls should be maintained separated or equally spaced in the runways of the members A and B and between the latter. To accomplish this it is obviously necessary that some means be employed for preventing contiguous balls from moving toward each other or away from each other to decrease or increase the normal width of space requisite to be maintained between the same to maintain all of said balls equally spaced apart between said members A and B. To accomplish this I provide retaining means comprising two equal members each consisting of a ring F provided on one face with projections spaced equi-distantly from each other and corresponding in number with the balls adapted to be received in the bearing for which said retaining device is adapted. In the instance illustrated nine of said projections G are provided which are spaced equi-distantly from each other circumferentially of said ring F. Each of said projections G is provided with one flat face extending parallel with the plane of the axis of said ring F. The other face of each projection is of concave form and describes an arc so that the free end of each of said projections is thicker at said end than between its ends, said concave face meeting the face of the ring F from which said projection extends substantially tangentially, the concavity extending into said face of said ring to provide recesses H in the latter. The flat faces of a plurality of said projections of said rings F are provided with recesses I, as shown in Fig. —2—, in which the flanges or projections at the ends of flat springs J are adapted to be received; said springs being adapted to exert a separating force upon contiguous projections of the opposed rings F and serving also to prevent separation of said rings F in the direction of their axis.

In practice, after the balls E have been interposed between the members A and B and have been manually spaced between them so as to be substantially equidistant from each other, the projections of one of said rings are inserted into the runway so that each of said projections passes between two contiguous balls E. The ring carrying said projections is then turned circumferentially in the runway so as to throw all of the balls contained in the latter in contact with the concave faces of said projections. The projections or flanges of the said springs J having been mounted in the recesses I before insertion of said projections in the runway, will, when the projections of the other ring are inserted between the flat faces of the projections of the first-named ring and the balls in contact with the concave faces of the contiguous projections, spring into the recesses I in the projections of the last-named ring and thereafter said rings will be inseparable without distorting said springs. The flat faces of the projections of the two rings F oppose each other as do also the concave faces thereof and the action of said springs J will be to force the concave faces toward each other with a very light pressure so as to engage the balls between said concave faces. By rendering the free ends of the projections of greater width than between their ends the tendency of the pressure imparted by the springs J will be to so engage the concave faces of said projections with the balls as to tend to prevent separation of the rings in the direction of their axis.

The device may be modified in various ways without departing from the invention, that is to say, in place of the recesses I the flat faces of some of the projections may be provided with concave recesses K' which become opposed when the rings are both inserted to throw the projections between the balls E of the bearing. Between said projections and in said recesses K' U-shaped springs L may be received and engaged; said projections being sprung past each other against the action of said springs L and the latter being adapted to exert a separating force on the opposed flat faces of the projections to the same end as the Z-shaped springs J, shown in Fig. —2—. The device may be further modified in construction, as shown in Figs. —4— and —6—, in which the opposing flat faces of some of the projections are provided with recesses M which are substantially of dove-tail shape and of a depth about double the thickness of the flat springs N adapted to be interposed between said projections. The said springs N are V-shaped and of a length corresponding to the greatest length of the recess M and adapted to be sprung into the latter so that one arm thereof is firmly engaged in one of said recesses and the other arm thereof is free and enters a similar recess M in the other member, said spring being adapted to exert the aforesaid separating force and being also adapted to resist separation of the rings F in the direction of their axis.

My said invention is very simple and efficient and presents the advantage of taking up all play in the bearings so as to prevent rattling thereof while at the same time it permits separation and removal of the rings F from the bearing without distorting said rings or their projections G.

I claim as my invention:

1. The combination with two relatively rotatable members, balls interposed therebetween for maintaining the same concentric, there being a free annular space between said members open at its ends, of two opposed rings each provided with projections adapted to enter said free space from opposite sides and extend between the balls therein for maintaining the latter equally spaced therein, each of said balls engaged between two projections of the respective rings, and springs interposed between said rings and engaged with the projections thereof for normally maintaining said projections of said respective rings in contact with said balls.

2. The combination with two relatively rotatable members, balls interposed therebetween for maintaining the same concentric, there being a free annular space between said members open at its ends, of two opposed rings each provided with projections adapted to enter said free space from opposite sides and extend between the balls therein for maintaining the latter equally spaced therein, each of said balls engaged between two projections of the respective rings, and springs interposed between said rings and engaged with the projections thereof for normally maintaining said projections of said respective rings in contact with said balls, and preventing separation of said rings in the direction of their axis.

3. In a ball bearing, balls, means for maintaining the same equidistantly spaced, comprising two opposed rings each provided on the face opposing the other with projections corresponding in number with the balls in said bearing and adapted to enter the runway for said balls from opposite directions, each of said balls engaged between two projections of the respective rings, and springs acting to normally maintain said projections thereof in yielding contact with said balls.

4. In a ball bearing, balls, means for maintaining the same equidistantly spaced, comprising two opposed rings each provided on the face opposing the other with projections corresponding in number with the balls in said bearing and adapted to enter the runway for said balls from opposite directions, said projections overlapping and each of said balls engaged between projections of the respective rings, and means interposed between the projections of said respective rings in the spaces alternating with those containing said balls for yieldingly maintaining said projections in surface contact with said balls, said means preventing separation of said rings in the direction of their axis.

5. In a ball bearing, balls, means for maintaining the same equidistantly spaced, comprising two opposed rings each provided on the face opposing the other with projections corresponding in number with the balls in said bearing and adapted to enter the runway for said balls from opposite directions, each of said balls engaged between two projections of the respective rings, springs interposed in the spaces between the projections of said respective rings alternating with the spaces containing said balls and acting to separate said projections in the direction of relative rotation of said rings, there being recesses in the opposing faces of said projections opposing the said springs and in which the latter engage to prevent separation of said rings in the direction of their axis.

In testimony whereof I have signed my name in presence of two subscribing witnesses.

LEO PONDELICK.

Witnesses:
  RUDOLPH WM. LOTZ,
  M. M. BOYLE.